United States Patent [19]
Coquelet et al.

[11] Patent Number: 5,777,609
[45] Date of Patent: Jul. 7, 1998

[54] METHOD OF EXPLOITING COLORS ON SCREEN

[75] Inventors: Dominique Coquelet; Jean-Francois Meffre, both of Pau; Neamen Kesks, Mont, all of France

[73] Assignee: Societe Nationale Elf Aquitaine, Paris La Defense, France

[21] Appl. No.: 352,185

[22] Filed: Dec. 1, 1994

Related U.S. Application Data

[63] Continuation of Ser. No. 866,164, Aug. 31, 1992, filed as PCT/FR91/00847 published as WO92/08222 May 14, 1992 abandoned.

[30] Foreign Application Priority Data

Oct. 29, 1990 [FR] France ................... 90 13384

[51] Int. Cl.$^6$ ........................................ G09G 5/06
[52] U.S. Cl. .................... 345/199; 345/150; 395/126
[58] Field of Search ........................ 345/199, 150, 345/153, 154, 155, 121, 126, 185, 186, 122, 203, 135, 1, 3, 139; 395/131, 129, 132, 126, 125, 119

[56] References Cited

U.S. PATENT DOCUMENTS

| | | | |
|---|---|---|---|
| 4,225,861 | 9/1980 | Langdon, Jr. et al. | 345/186 |
| 5,067,098 | 11/1991 | Moellering et al. | 395/126 |
| 5,129,077 | 7/1992 | Hillis | 364/239 |
| 5,155,478 | 10/1992 | Sekiya et al. | 395/132 |
| 5,252,953 | 10/1993 | Sandrew et al. | 345/122 |

FOREIGN PATENT DOCUMENTS 2090506  7/1982  United Kingdom.

OTHER PUBLICATIONS

John A. Richards, Remote Sensing Digital Image Analysis, 1986, pp. 267–275.

*Primary Examiner*—Xiao Wu

[57] ABSTRACT

Process for using colors on a screen with which is associated a color palette especially adapted for the visualization of an image, the content of which is a function of an angles, by altering the transfer function of the palette by circular shift.

25 Claims, 3 Drawing Sheets

θ=45°

1

θ=135°

2

θ=225°

3

θ=315°

4

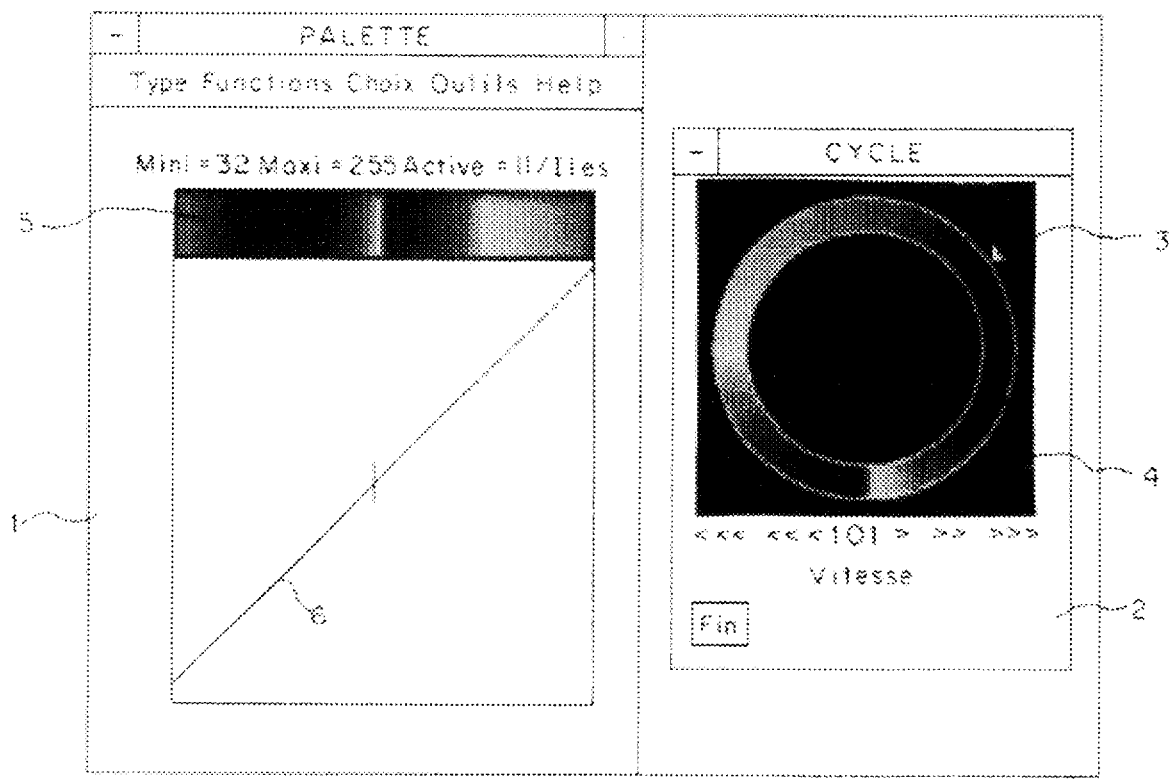
FIG_3

1

METHOD OF EXPLOITING COLORS ON SCREEN

This application is a continuation of application Ser. No. 07/866,164, filed as PCT/FR91/00847 Aug. 31, 1992 published as WO92/08222 May 14, 1992, now, abandoned.

FIELD OF THE INVENTION

The present invention relates to a method of exploiting colours on a computer screen particularly well suited to images whose contents represent parameters which are cyclic, in particular, whose contents represent an angle.

BACKGROUND OF THE INVENTION

It is usual with respect to mappings made with the aid of a computer which include graphical outputs, to reserve a graphics screen for the visualisation of the outputs of the mapping and to use an alpha-numeric terminal for the man-machine dialogue. The images plotted are composed of a plurality of elementary points (pixels). Each point is allocated a colour code in memory, each colour code defined with a number B of bits, thus allowing $2^B$ colours to be defined, B commonly being equal to 8. Conventionally each code $C_i$, is associated with a colour characterised by its three components: red $R_i$, green $V_i$, blue $B_i$, by virtue of a correspondence established in a table, called a colour palette (or LUT or Look up Table, table of false colours, colour map etc.) linked with the screen. The contents of the colour palette define a transfer function between the colour codes and the colours actually displayed. The use of the colour palette defines a memory architecture allowing image representation with a reduced memory capacity. It is furthermore usual, with this type of architecture, to rapidly and interactively modify the correspondences between the codes and the colours actually displayed independently of the image, without changing the contents of the table or completely rewriting the image memory. This interactive modification of the distribution of colours in the table is performed by virtue of a particular mapping which permits modification of the transfer function.

This modification of mapping makes it possible to visualise successive sequences of a same item of information presented differently (allows displaying successive versions of an image) so as to better highlight information to be displayed, such as an indicator of saturation, of a visual filter, etc.

These second functions (which modify the transfer function) are mappings in themselves since, in the mathematical sense, a set of $2^B$ elements (the $C_i$) are mapped into a set with $2^B$ elements (the $C'_i$). These second functions are normally affine functions or juxtaposed portions of affine functions in adjoining domains, making it possible, for example, to simulate contractions, expansions, inversions, and repetitions of the original basic transfer function and to even simulate the expunging of certain colours or colour ranges whilst still complying with the order of the colours in the domains.

These second functions are nevertheless poorly suited for display of images which represent parameters which are cyclic in magnitude, such as an angle. For such images, obtaining sequences of differently coloured versions of an image to be displayed requires special manipulations of the colour palette, or even the use of a second specific palette not allowing interactivity, so that, in particular, the angle θ=0° and the angle θ=360° are represented similarly (else the interpretation may be falsified) and so that the use of a band-pass filter containing the zero angle poses no particular problem.

SUMMARY OF THE INVENTION

The present invention relates to a method of exploiting colours permitting a continuous interactive colour scan independent of the displayed image, and particularly suited to images which represent parameters which are dependent upon an angle or are cyclic, for obtaining different multiple representations of the same image.

According to the invention, a method is provided which exploits colours by interactively modifying a colour palette mapped to an image which represents parameters which are cyclic. In particular, a transfer function including a basic palette with $2^B$ colours, linked with a screen, B being a positive integer is modified by:

splitting an interval from 0° to 360° into $2^B$ slices of angles of equal size, assigning a serial number lying between 1 and $2^B$, (which may ascend as a function of the angles) to correspond to each of the $2^B$ slices of angles, choosing a value of a lighting angle, determining the serial number i of the slice to which the lighting angle corresponds, creating a second palette so that the colour associated with the code $C_{j+(i-1)}$ of the basic palette is made to correspond to a code $C'_j$ of the second palette. An alternative consists in making the colour associated with the code $C_{j-(i-1)}$ of the basic palette correspond with the code $C'_j$ The transfer function of the basic palette can be first inverted such that the cyclic permutation is performed in the direction contrary to the permutation described above.

This manipulation is particularly advantageous for the displaying of azimuth maps since it makes it possible to obtain dynamic lighting effects without complicated numerical computations.

The invention also relates to a method for permitting a representation of the palette which is particularly suited to images which represent parameter(s) which are an angle and which permit very easy utilization of the method of interactive exploitation of colours according to the invention.

It is common to display on screen the palette mapped to the visualised image concurrently with the image itself. Usually, palettes are displayed as a polychrome rectangular band consisting of identically sized blocks of different colours positioned side by side, each block corresponding to one colour of the basic palette. If appropriate, it is also usual to display along with the palette, representations of the second functions for modifying the transfer function and the result of the modified palette. However, prior art displays of representations of the second functions (modifying the transfer function) cannot be represented in a space with two orthogonal dimensions.

In a further embodiment of the invention, the method of displaying the palette of colours used according to the invention (for the visualization of images which represent parameters which are dependent upon an angle) includes displaying the colours of the palette mapped to the image after modifying the transfer function of the basic palette not in a rectangular band, but in an annulus. Each selected lighting angle is manifested by a rotation of the set of colours inside the annulus in an amount equal to the difference between the new lighting angle and the preceding lighting angle. The new lighting angle may be selected by placing a marker on the inner or outer circle of the annulus.

The display method of the present invention makes it easy to discern the manipulations performed and the lighting angle used. Also, a complete interactive scan of the basic colour palette may be indicated by a 360° rotation of the colour annulus.

BRIEF DESCRIPTION OF THE FIGURES

Other characteristics and advantages of the present invention will emerge more clearly on reading the following description made with reference to the attached drawing in which

FIG. 3 illustrates two screen copies of both the conventional display of a colour palette in its common use and the display according to the invention.

DETAILED DESCRIPTION

Figure 1:
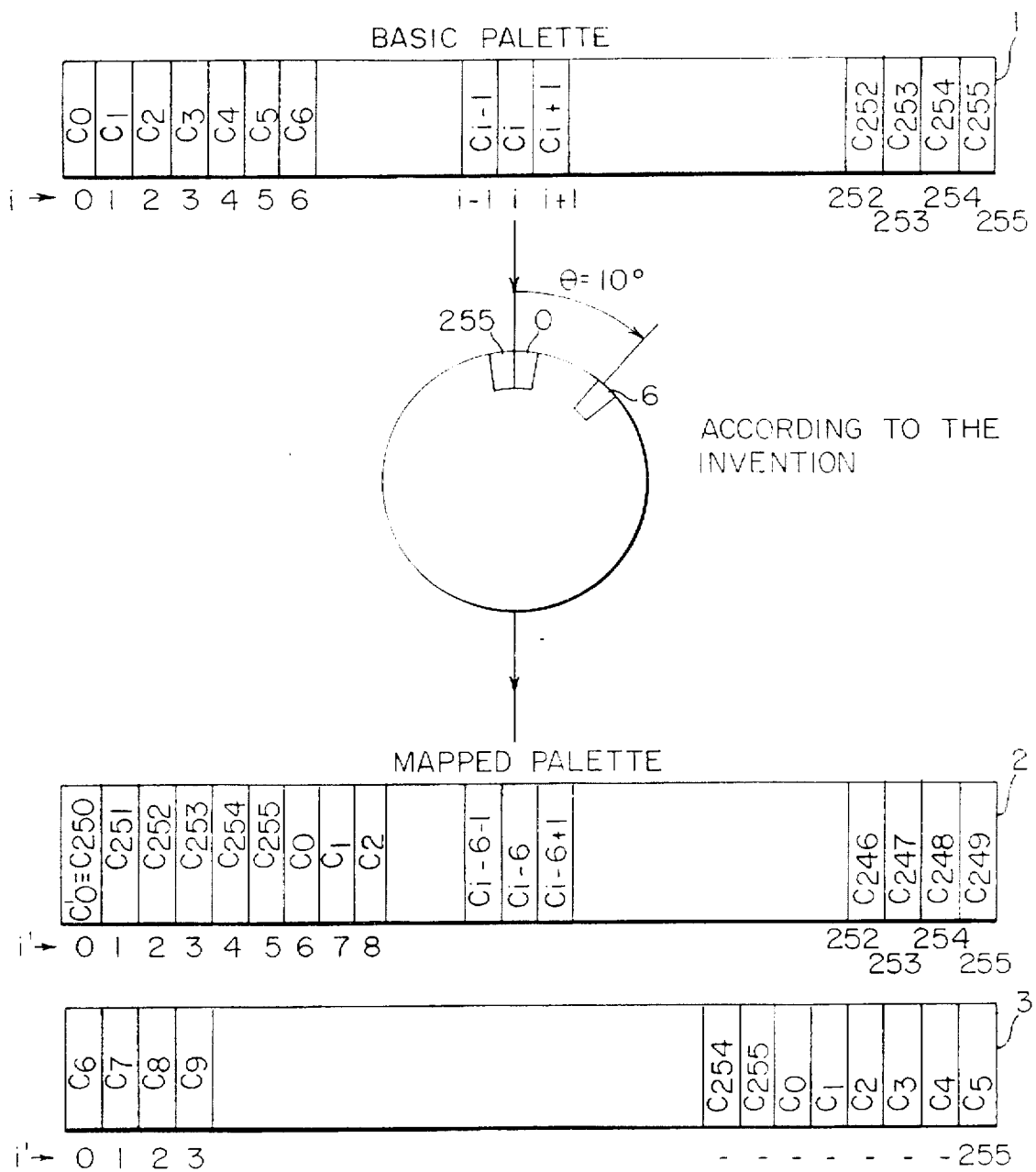
FIG. 1 is a schematic representation of a colour palette and its exploitation according to the invention.
Figure 2A:
FIGS. 2A–2D illustrate four screen copies showing the effect of the method of exploiting colours according to the invention, applied to a function with two dimensions X, Y, displaying the azimuth associated with a given surface.
Figure 2B:
Figure 2C:
Figure 2D:

The basic colour palette (1), represented schematically in FIG. 1, conventionally consists of 256 (B=8) colour cells $C_j$, j varying from 0 to 255, the colours being schematised by rectangular bands and classified by increasing values of j.

The colour palette (2) represents schematically the palette actually mapped to an image being displayed on screen after a modification of the basic palette according to the invention. In the example shown here, the selected lighting angle is $\theta=10°$. The selected lighting is determined to correspond to the 7th interval, here associated with the colour $C_6$. The modification therefore comprises shifting all the colours of the basic palette 6 cells to the right so that a modified colour palette is created having a new cell $C'_6$ containing the colour of cell $C_0$ of the original basic palette. In general, new cell $C'_i$ of the modified colour palette contains the colour of the cell $C_i$ of the original basic palette such that $i=i'-6$ if i is positive or zero, or contains the colour of cell $C_j$ of the original basic palette such that $j=i'+256-6$ in the contrary case.

Of course, the modification may also be performed in the opposite direction, according to the chosen convention. In the new palette obtained (3) there is then associated, with the new cell $C'_0$, the colour $C_6$ of the original basic palette, and generally, with the new cell $C'_i$, the colour cell $C_{i'+6}$ of the original basic palette is associated, if i'+6 is less than or equal to 255 and the colour of cell $C_{i'+6-255}$ in the contrary case.

The method has been applied to an image (256 pixels×256 pixels) displaying the maximum dip values (calculated for each pixel) of a topographical surface. Each grey tone corresponds to a range of dip values for a given lighting angle $\theta$, the palette changing in accordance with the selected lighting angle $\theta$.

Thus the colour associated with a given pixel $C_i$ makes it possible to determine the approximate value of the dip at the corresponding point of the topographical surface.

The four images (1) to (4) depicted in FIGS. 2A–2D represent the same function represented with 4 different values of a selected lighting angle: 45°, 135°, 225°, 315° respectively. The effect obtained is that of a rotating lateral lighting, which can make it possible to reveal configuration details (reliefs or others), which do not show up if only a single or at best a small number of images are available.

FIG. 3 shows a possible representation (1) of a colour palette (5) according to the conventional method and its associated transfer function (6) side by side with an example (2), according to the invention, of the same palette distributed in an annulus (4), the selected lighting angle being indicated by a marker (3).

We claim:

1. A method of exploiting colours by modifying a colour palette comprising the steps of:
   splitting a continuous range of colours into $2^B$ slices of equal size, where B is an integer and beginning and end colours of the range of colours are nearly the same, thereby creating a first palette;
   assigning a serial number between 1 and $2^B$ to each of the slices;
   choosing a lighting angle value;
   determining the serial number of the slice to which the lighting angle value corresponds;
   creating a second palette by shifting each of the $2^B$ slices in response to the determination of the serial number to which the lighting angle value corresponds, such that said second palette includes a continuous range of colours divided into $2^B$ color values; and
   displaying an image as a function of the second palette.

2. The method according to claim 1 wherein the image displayed represents azimuth or dip maps.

3. The method according to claim 1, wherein,
   The second palette is created by shifting the slices so that the slice to which the lighting angle value corresponds is assigned a new serial number of zero, and all other slices are assigned new serial numbers so that the order of the slices remains the same in the first and second palettes.

4. The method according to claim 3, characterized in that the lighting angle value is chosen by a mobile marker located on a circle such that the angle between the marker and a reference marking the zero angle is equal to the lighting angle value.

5. The method of claim 1, further comprising the steps of:
   displaying, in the form of an annulus, the continuous range of colors, which has been split into $2^B$ slices; and
   choosing the lighting angle value using a mobile marker located on a circle of said annulus such that the angle between the marker and a reference point representing the zero angle is equal to the lighting angle value.

6. A method of displaying an image comprising the steps of:
   (a) numbering n slots;
   (b) assigning n slot-color values to each of said n slots so that subsequent slots have similar slot-color values and so that a spectrum is formed when n colors, respectively corresponding to said n slot-color values, are displayed in the order of their corresponding slot-color value assignments;
   (c) assigning a range of color values to each of said n slots;
   (d) reassigning said n slot-color values to each of said n slots by shifting all of said slot-color values with respect to their originally assigned n slots, such that the reassigned n slot-color values represent a color spectrum having n colors;
   (e) modifying an image containing a plurality of pixels, each pixel having an original color value, including the sub-steps of,
      (e1) determining the slot assigned the range in which the original color value of each pixel falls; and
      (e2) changing the original color value of each pixel to the slot-color value assigned to the slot determined in step (e1); and (f) displaying an image utilizing each of the changed pixel color values changed in step (e2).

7. The method of claim 6, wherein step (d) includes:

reassigning said n slot-color values to each of said n slots so that a slot-color value originally assigned to slot i becomes assigned to slot i-(x−1), where x is any integer from 1 to n−1 and where i is any integer from x to n, and any slot-color value originally assigned to slot j becomes assigned to slot n+j-(x−1), where j is any integer from 1 to x−1.

8. The method of claim 6, further including:

(g) displaying a spectrum of n colors, respectively corresponding to said n slot-color values, in the order of their corresponding slot-color value assignments.

9. The method of claim 8, wherein step (g) further includes:

displaying a spectrum of n colors in the form of an annulus.

10. The method of claim 9, wherein step (d) includes:

(d1) indicating a position on said displayed spectrum; and (d2) reassigning said n colors in response to the indicated position.

11. The method of claim 10 wherein step (d1) includes indicating a position on said displayed spectrum by moving a cursor to point to color on said annulus.

12. The method of claim 6, wherein said displayed image is a topographical map, and step (d) includes:

(d1) selecting a lighting angle; and (d2) reassigning said n colors in response to the selected lighting angle.

13. The method of claim 6, wherein said n colors are only black, white and shades of grey.

14. The method of claim 6, wherein said n colors include red, green and blue.

15. The method of claim 6, wherein said n slots are memory locations in a computer.

16. An apparatus for displaying an image comprising:

means for numbering n slots;

means for assigning n slot-color values to each of said n slots so that subsequent slots have similar slot-color values and so that a spectrum is formed when n colors, respectively corresponding to said n slot-color values, are displayed in the order of their corresponding slot-color value assignments;

means for assigning a range of color values to each of said n slots;

means for reassigning said n slot-color values to each of said n slots by shifting all of said slot-color values with respect to their originally assigned n slots, such that the reassigned n slot-color values represent a color spectrum having n colors;

means for modifying an image containing a plurality of pixels, each pixel having an original color value, including, means for determining the slot assigned the range in which the original color value of each pixel falls; and means for changing the original color value of each pixel to the slot-color value assigned to the slot determined by said determining means; and a display, displaying an image utilizing each of the changed pixel color values changed by said changing means.

17. The apparatus of claim 16, wherein said reassigning means reassigns said n slot-color values to each of said n slots so that a slot-color value originally assigned to slot i becomes assigned to slot i-(x−1), where x is any integer from 1 to n−1 and where i is any integer from x to n, and any slot-color value originally assigned to slot j becomes assigned to slot n +j-(x−1), where j is any integer from 1 to x−1.

18. The apparatus of claim 16, wherein said display displays a spectrum of n colors, respectively corresponding to said n slot-color values, in the order of their corresponding slot-color value assignments.

19. The apparatus of claim 18, wherein said display displays a spectrum of n colors in the form of an annulus.

20. The apparatus of claim 19, wherein said reassigning means includes:

means for indicating a position of said displayed spectrum on said display; and said reassigning means reassigns said n colors in response to the indicated position.

21. The apparatus of claim 18, wherein said indicating means indicates a position on said displayed spectrum by moving a cursor to point to color on said annulus.

22. The apparatus of claim 16, wherein said display displays a topographical map, and said reassigning means includes:

means for selecting a lighting angle; and said reassigning means reassigns said n colors in response to said selecting means.

23. The apparatus of claim 16, wherein said display is a grey-tone display and said n colors are only black, white and shades of grey.

24. The apparatus of claim 16, wherein said display is a multi-color display and said n colors include red, green and blue.

25. The apparatus of claim 16, wherein said n slots are memory locations in a computer.

* * * * *